United States Patent
Hollar et al.

(10) Patent No.: US 12,143,831 B2
(45) Date of Patent: *Nov. 12, 2024

(54) METHODS, SYSTEMS AND COMPUTER PROGRAM PRODUCTS FOR AUTOMATIC CALIBRATION OF ANTENNAS

(71) Applicant: Wiser Systems, Inc., Raleigh, NC (US)

(72) Inventors: Seth Edward-Austin Hollar, Raleigh, NC (US); Ryan Michael Tedrick, Raleigh, NC (US)

(73) Assignee: Wiser Systems, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/318,014

(22) Filed: May 16, 2023

(65) Prior Publication Data

US 2023/0284037 A1 Sep. 7, 2023

Related U.S. Application Data

(63) Continuation of application No. 17/864,495, filed on Jul. 14, 2022, now Pat. No. 11,659,406, which is a
(Continued)

(51) Int. Cl.
*H04W 16/20* (2009.01)
*H04B 17/12* (2015.01)
(Continued)

(52) U.S. Cl.
CPC ............ *H04W 16/20* (2013.01); *H04B 17/12* (2015.01); *H04B 17/21* (2015.01); *H04B 17/391* (2015.01); *H04W 16/225* (2013.01)

(58) Field of Classification Search
CPC . H04W 16/20; H04W 16/225; H04W 64/003; H04B 17/12; H04B 17/21;
(Continued)

(56) References Cited

U.S. PATENT DOCUMENTS 5,684,672 A * 11/1997 Karidis ............... H01Q 1/2258
343/702
6,317,087 B1 * 11/2001 Laugal ................ H04W 16/20
(Continued)

FOREIGN PATENT DOCUMENTS

CN 108267113 A * 7/2018
WO WO-9608908 A2 * 3/1996 ............ H04B 7/082
(Continued)

*Primary Examiner* — Lana N Le
(74) *Attorney, Agent, or Firm* — Stanek Lemon Crouse & Meeks, PA (57) ABSTRACT

Methods of auto-calibrating antennas in a target environment are provided including obtaining a map and associated scale of the target environment; displaying the map to a user on a user display device; discovering a plurality of antennas present in the target environment; illustrating the discovered plurality of antennas on the map; repositioning at least some of the plurality antennas on the map; locking selected ones of plurality of antennas into a current position to provide a plurality of locked antennas, wherein the plurality of locked antennas is equal to zero or greater; and auto-calibrating a remaining plurality of unlocked antennas, wherein auto-calibrating includes moving each of the remaining plurality of unlocked antennas from a first position to a second position.

12 Claims, 6 Drawing Sheets

Related U.S. Application Data continuation of application No. 16/257,309, filed on Jan. 25, 2019, now Pat. No. 11,399,291.

(60) Provisional application No. 62/621,833, filed on Jan. 25, 2018.

(51) Int. Cl.
*H04B 17/21* (2015.01)
*H04B 17/391* (2015.01)
*H04W 16/22* (2009.01)

(58) Field of Classification Search
CPC .... H04B 17/391; H04B 17/23; H04B 7/0671; H04B 17/29; H04B 17/0085; H04B 7/0691; H04B 17/3912; H04B 7/04; H01Q 1/125; H01Q 3/14; H01Q 1/2258; H01Q 1/2266; H01Q 1/421; H01Q 1/48; H01Q 1/27
See application file for complete search history.

(56) References Cited

U.S. PATENT DOCUMENTS

| | | | | |
|---|---|---|---|---|
| 9,749,873 B1 * | 8/2017 | Chang | ................ | H04W 16/225 |
| 10,064,012 B1 | 8/2018 | Boston | | |
| 10,352,707 B2 | 7/2019 | Kordari | | |
| 10,462,762 B2 | 10/2019 | Hollar | | |
| 10,856,106 B1 * | 12/2020 | Ganesan | ................ | H04W 4/021 |
| 10,863,314 B2 | 12/2020 | Hollar | | |
| 11,399,291 B2 * | 7/2022 | Hollar | ................ | H04B 17/391 |
| 11,659,406 B2 * | 5/2023 | Hollar | ................ | H04W 16/20 |
| | | | | 455/446 |
| 2007/0159385 A1 * | 7/2007 | Lawrence | ............... | G01S 19/53 |
| | | | | 342/357.36 |
| 2008/0079723 A1 * | 4/2008 | Hanson | ................ | G06T 17/05 |
| | | | | 345/419 |
| 2009/0251384 A1 * | 10/2009 | Ligtenberg | ............ | H04B 17/12 |
| 2017/0211745 A1 * | 7/2017 | Alban | ...................... | H01Q 1/125 |
| 2017/0243138 A1 * | 8/2017 | Dzierwa | ............... | H04W 16/14 |
| 2017/0303089 A1 | 10/2017 | Wang | | |
| 2018/0014217 A1 * | 1/2018 | Kleinbeck | ............ | H04W 24/08 |
| 2018/0034566 A1 * | 2/2018 | Tankielun | ............ | H04B 17/12 |
| 2018/0069605 A1 * | 3/2018 | Gharavi | ................ | H01Q 3/36 |
| 2018/0248613 A1 * | 8/2018 | Peitzer | ................... | H04B 17/12 |
| 2019/0086212 A1 | 3/2019 | Koshy | | |
| 2020/0182959 A1 * | 6/2020 | Markhovsky | ......... | G01S 5/0236 |
| 2020/0192351 A1 | 6/2020 | Rastoll | | |
| 2020/0217666 A1 * | 7/2020 | Zhang | ................ | G01C 21/3848 |
| 2020/0278683 A1 | 9/2020 | Dean | | |
| 2020/0364187 A1 * | 11/2020 | Tran | ......................... | G06N 3/02 |
| 2021/0258089 A1 * | 8/2021 | Wan | ..................... | H04B 7/0897 |
| 2021/0266079 A1 * | 8/2021 | Butcher | ................ | H04B 17/11 |
| 2021/0306970 A1 * | 9/2021 | Bhambra | ............ | H04W 64/006 |
| 2023/0130508 A1 * | 4/2023 | Hobbs | ..................... | H01Q 1/48 |
| | | | | 343/700 |

FOREIGN PATENT DOCUMENTS

| | | | | |
|---|---|---|---|---|
| WO | WO 2012/154926 A2 | 11/2012 | | |
| WO | 2016138567 A1 | 3/2016 | | |
| WO | WO-2016065368 A1 * | 4/2016 | ............ | G01S 13/74 |
| WO | WO-2020201049 A1 * | 10/2020 | ........... | H04B 7/0452 |

* cited by examiner

METHODS, SYSTEMS AND COMPUTER PROGRAM PRODUCTS FOR AUTOMATIC CALIBRATION OF ANTENNAS

CLAIM OF PRIORITY

The present application is a continuation of U.S. patent application Ser. No. 17/864,495, filed Jul. 14, 2022, which is a continuation of U.S. patent application Ser. No. 16/257,309, filed Jan. 25, 2019 (now U.S. Pat. No. 11,399,291, issued Jul. 26, 2022), which claims priority to U.S. Provisional Application Ser. No. 62/621,833, filed on Jan. 25, 2018, the contents of which are hereby incorporated herein by reference as if set forth in their entireties.

FIELD

This present inventive concept relates generally to antennas and, more particularly, to calibration of antennas in a target environment.

BACKGROUND

In the early 2000s, ultra-wideband (UWB) was cited as a promising technology as "wireless universal serial bus (USB)". However, the market turned in a different direction. Nonetheless, the groundwork from the Federal Communications Commission (FCC) was laid so that devices could operate legally in the United States and abroad. Until recently, UWB devices operating in the 3.1 to 10 GHz range tended to be composed of discrete components having a relatively high price point. Recently, however, UWB integrated circuit (IC) chips have come into the marketplace allowing for lower cost UWB transceivers to be built and sold. With the lower price point, these devices may reach a broader audience with greater manufacturing quantities.

Inherent in UWB technology is the ability to create narrow pulse widths. These pulse widths can be used to establish an arrival time of a radio frequency (RF) signal with very high granularity. A precise timestamp can be determined for receiving a signal and transmitting a signal. When timestamps are compared for a message that is sent from one device to the next, a distance between devices can be calculated based on the difference in time and the speed of the signal through the air. This information can be used to provide location information with respect to devices in the UWB network.

SUMMARY

Some embodiments of the present inventive concept provide methods of auto-calibrating antennas in a target environment including obtaining a map and associated scale of the target environment; displaying the map to a user on a user display device; discovering a plurality of antennas present in the target environment; illustrating the discovered plurality of antennas on the map; repositioning at least some of the plurality antennas on the map; locking selected ones of plurality of antennas into a current position to provide a plurality of locked antennas, wherein the plurality of locked antennas is equal to zero or greater; and auto-calibrating a remaining plurality of unlocked antennas, wherein auto-calibrating includes moving each of the remaining plurality of unlocked antennas from a first position to a second position.

In further embodiments, auto-calibrating may be preceded by determining x, y and z coordinates for a current location for each of the remaining plurality of unlocked antennas.

In still further embodiments, determining the x, y and z coordinates for the current location for each of the remaining plurality of unlocked antennas may be followed by determining a new location for each of the remaining plurality of unlocked antennas using the following equation:

$$xyz_{ant-new} = xyz_{ant-old} * \text{FilterValue} + (1 - \text{FilterValue}) * xyz_{ant-old},$$

where $xyz_{ant-new}$ is an updated location; $xyz_{ant-old}$ is a previous location and FilterValue is between 0 and 1.

In some embodiments, repositioning may include selecting one of the plurality of antennas illustrated on the user display and dragging the selected one of the plurality of antennas to one of a proper location and a different location on the map.

In further embodiments, auto-calibrating may be followed by verifying locations of the plurality of antennas.

In still further embodiments, verifying may include calculating a distance between a current position of one of the plurality of antennas relative to others of the plurality of antennas; determining if the calculated distance is too large or too small; verifying the current position of the one of the plurality of antennas if it is determined that the calculated distance is not too large or too small; and repeating the calculating, determining and verifying for each of the plurality of antennas.

In some embodiments, obtaining may include uploading the map and associated scale.

In further embodiments, the plurality of antennas may be positioned in a real time location system (RTLS) network.

Related systems and computer program products are also provided herein.

DETAILED DESCRIPTION

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Using location information and a map of a target environment, some embodiments of the present inventive concept provide methods of remote auto-calibration of system including a verification process. Details will be discussed below with respect to FIGS. 1 through 9 below.

Figure 1:
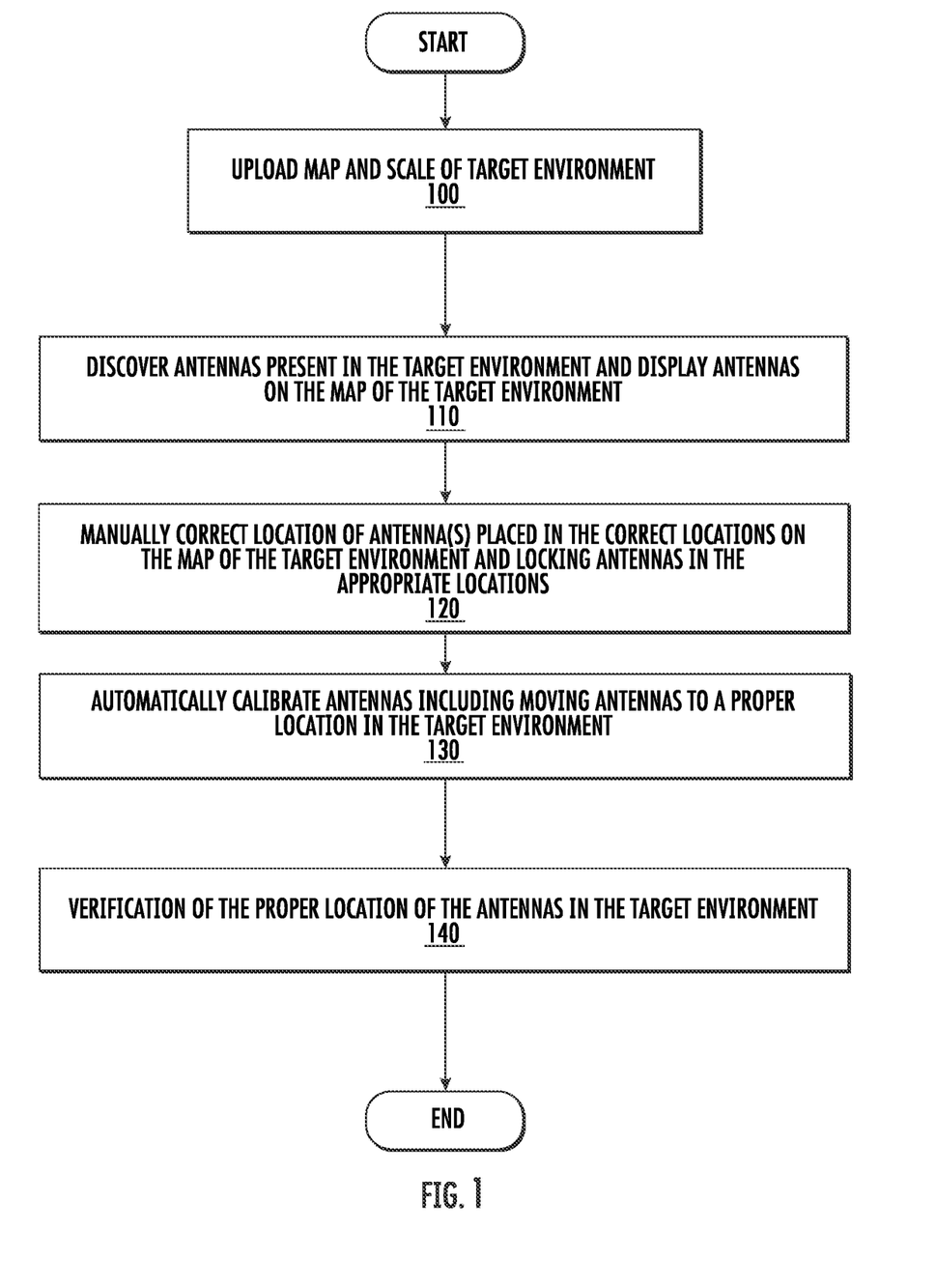
FIG. 1 is a flowchart illustrating methods in accordance with some embodiments of the present inventive concept.
Figure 2:
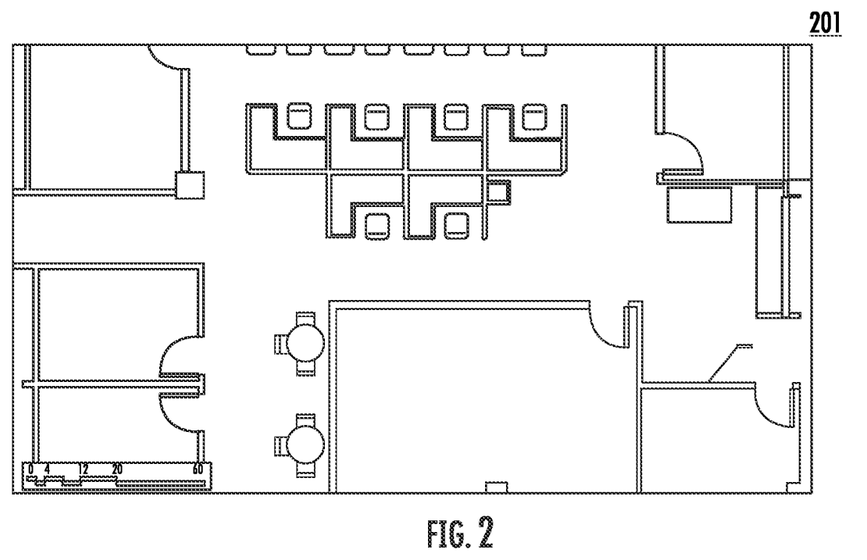
FIGS. 2 through 7 are diagrams illustrating various steps in the methods in accordance with some embodiments of the present inventive concept.

Referring first to the flowchart of FIG. 1, methods for automatically calibrating antennas in a target environment in accordance with some embodiments of the present inventive concept will be discussed. As used herein, calibration refers to the act of determining positions of antennas relative to one another or to another reference (for example, a map). Operations begin by uploading a map and scale of the target environment into the system (block 100) and displaying the map to a user. This environment can be any environment a user chooses. For example, the environment may be an office, an arena, a green house or the like. Furthermore, the "target environment" may be an indoor or outdoor environment without departing from the scope of the present inventive concept. An example office environment 201 is illustrated in FIG. 2. In some embodiments, the network may be a real time location system (RTLS) network, however, embodiments of the present inventive concept are not limited to this configuration.

A map may be generated and uploaded using any method known to those of skill in the art. For example, commonly assigned U.S. patent application Ser. No. 16/257,170, now U.S. Pat. No. 10,863,314, filed Jan. 25, 2018 discusses methods for generating a map of a target environment. The contents of this application are hereby incorporated herein by reference as if set forth in its entirety. This application is referenced for example only and, therefore, embodiments of the present inventive concept are not limited to this configuration.

Figure 3:
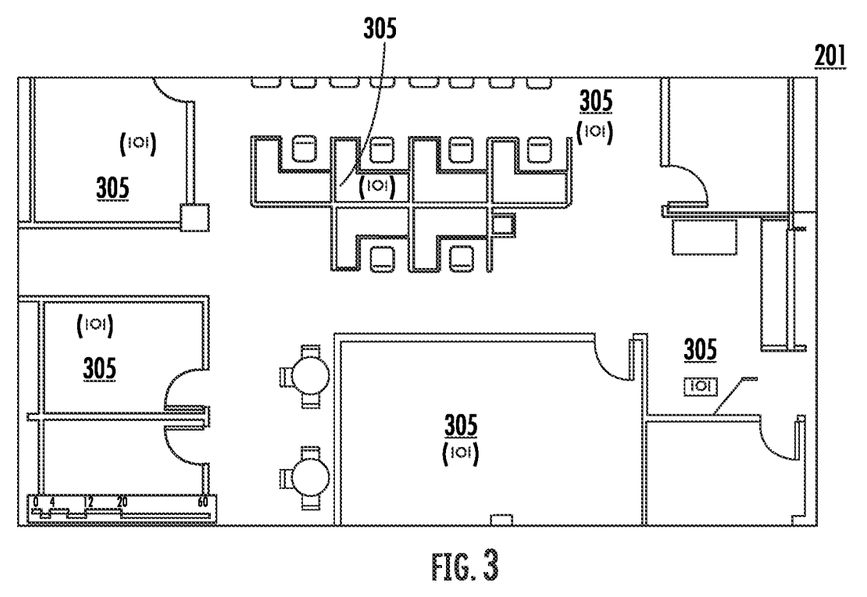
Figure 4:
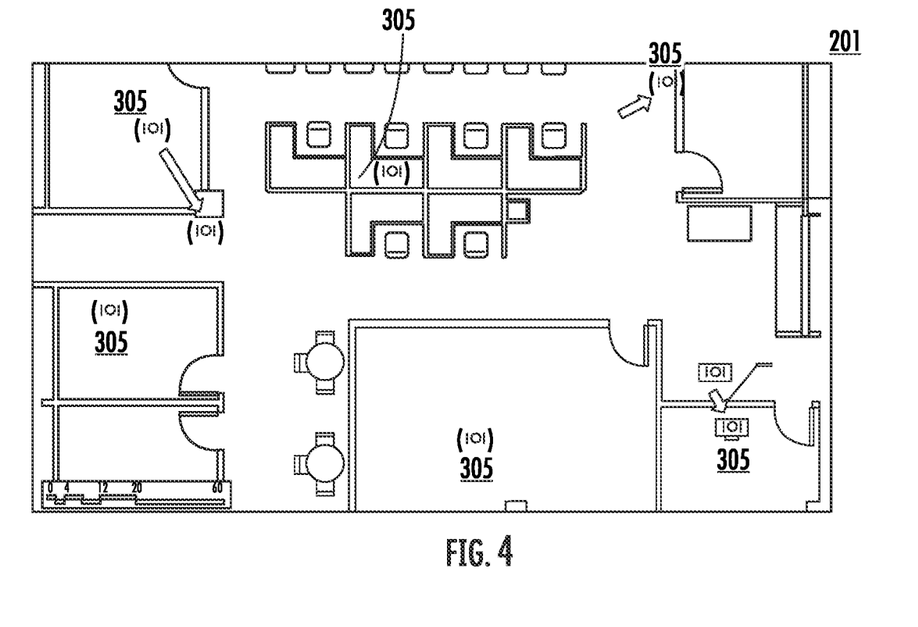
Figure 5:
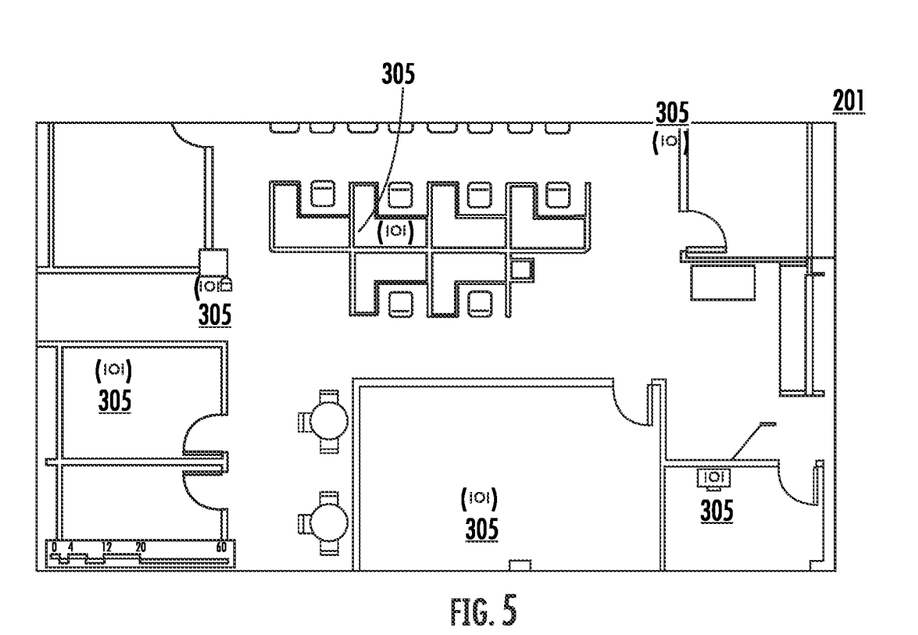

Once the environment map is uploaded (FIG. 2), the various antennas 305 present in the environment 201 may be discovered and may randomly appear on the map as they are discovered (block 110) as illustrated in FIG. 3. Alternatively, in some embodiments, the antennas 305 may be placed on the map using a "best first guess" based on information provided by the discovering antenna. Once all the antennas are discovered and illustrated on the map, a user may drag the antennas on the map to a proper/different location (block 120) as illustrated in FIG. 4. Some of the antennas 305 are moved as indicated by the arrows in FIG. 4. Once the antennas 305 are positioned in the proper location, the antennas can be locked into that position. For example, in some embodiments antennas can be "locked" down by pressing 'L' or right clicking on the context menu and selecting "locked" from a work station (block 120). Some of the antennas illustrated in FIG. 5 are locked at their locations as indicated by the presence of the lock image in FIG. 5.

Figure 6:
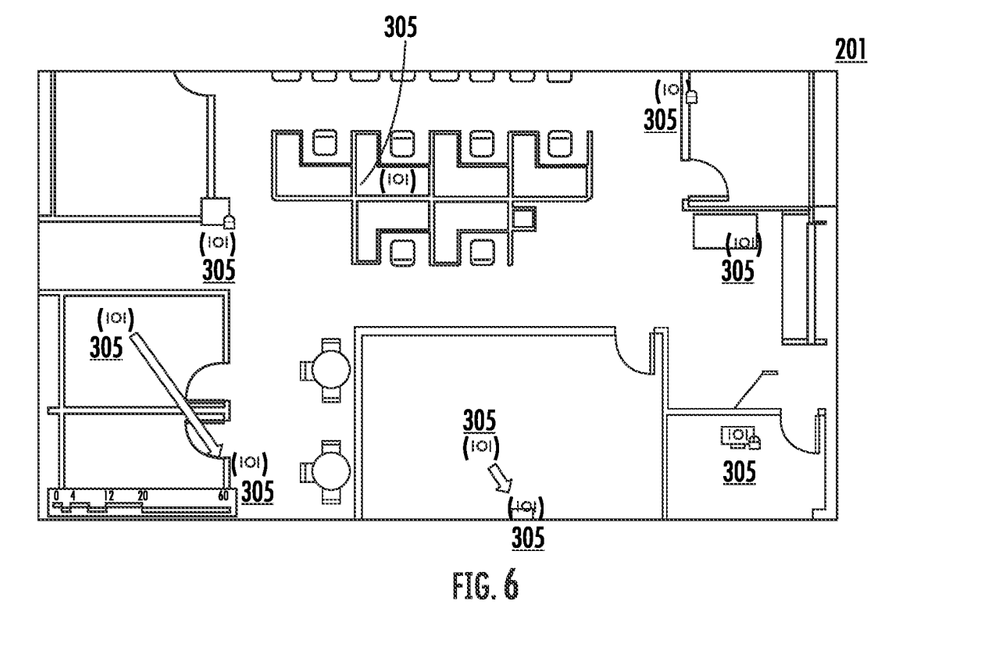

Embodiments of the present inventive concept provide an auto calibration function such that antennas are automatically moved based on relative locations thereof (block 130). For example, in some embodiments, the user may select an auto-calibration button or select auto-calibration from a drop down menu. The arrows in FIG. 6 illustrate moving antennas 305 from a first location to a second location during auto-calibration.

In some embodiments the auto-calibration process may include performing localization for each unlocked antenna and determining current x, y and z coordinates (xyz-current value) for each antenna. The antennas' new location is calculated to be between its original location and the newly calculated location, xyz-current. For example, a low-pass filter can be used to determine the new location using the following equation:

$$xyz_{ant-new} = xyz_{ant-old} * \text{FilterValue} + (1 - \text{FilterValue}) * xyz_{ant-old} \quad \text{(Eqn. 1)}$$

$xyz_{ant-new}$ is the updated location, $xyz_{ant-old}$ is the previous location and FilterValue is a value between 0 and 1 that determines the behavior of the low pass filter. These steps may be repeated as many times as needed for all the unlocked antennas. In some embodiments, during the auto-calibration process, the user can also manually move antennas to desired locations.

In embodiments discussed herein, a sequential method to determining locations of all the antennas is utilized. However, embodiments of the present inventive concept are not limited thereto. For example, in some embodiments, multi-variable mathematics may be used to calculate the location of the antennas simultaneously. For example, mathematically speaking, positions of the antennas can be functions of the distances and positions of surrounding antennas. Those functions can be linearized, and a matrix relating distance to antennas can be determined. If the matrix equation is over determined, statistical methods can be used to reduce the total error.

Figure 7:
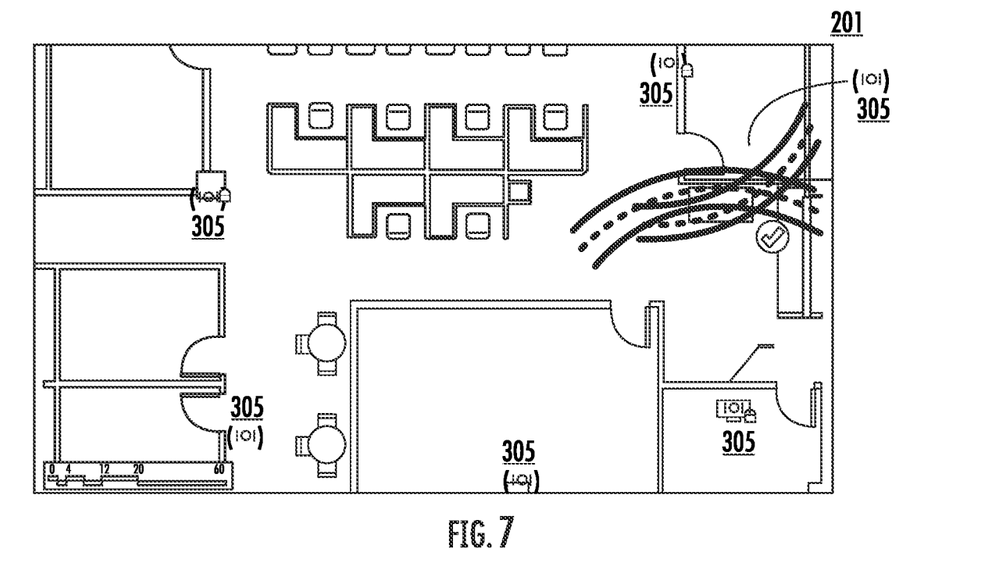

Finally, once the auto-calibration process is complete, the location of the antennas 305 may be verified (block 140). As illustrated in FIG. 7, the display of the target environment may include a visual indication, for example, a check mark, near the antenna that has been verified.

In some embodiments, the verification process may include, for each antenna, using the surrounding antennas to determine its location represented in the current xyz coordinates ($xyz_{current}$). The distance between $xyz_{current}$ and $xyz_{antenna}$ is calculated. If the difference is too large, then the calibration process fails, i.e. is not verified. In some embodiments, the solution may be a mirror image when looking at the x-y plane. If only two antennas are locked, there is a possibility that the remaining antenna positions were mapped in a mirrored position where the symmetry axis would be the line created by the two locked antennas. To address this situation, the positions of unlocked antennas are checked to ensure they are within the map bounds. If antennas are out of bounds the positions of unlocked antennas are flipped about the axis between the locked antennas. Provided all antennas are close to their calculated location, then the calibration process passes, i.e. verified.

Embodiments of the present inventive concept discussed herein discuss coordinates using three dimensions and the mirrored solution issue, which is predicated by assuming the solution is already in the correct plane. When using two fixed points there can also be issues with the solution being rotated about the line between the two antennas. One method to address this situation would be to choose a solution that maximizes the area covered by the antennas in the X, Y plane, while minimizing the difference between the antennas' positions in the Z dimension. Another method to address the same situation would be to provide a utility to allow the user to rotate the antennas positions about the line formed by the two locked antennas. For example, imagine rotating a clothes pin around a clothes line, where the clothes pin represents the mesh of antennas.

In particular, as illustrated in the upper right hand corner of FIG. 7, the crossing dotted and solid semicircles indicate a range found by two neighboring antennas (dotted semicircle) and the allowed difference (+/− as indicated by the solid semicircles).

In embodiments, using a single fixed antenna, embodiments of the present inventive concept can also have a second rotational offset in the X, Y plane. This can be addressed in various ways. For example, it can be addressed by ensuring that all of the antennas exist within the bounds of the map, or by providing a utility that allows the user to rotate the mesh about the locked antenna in the X, Y plane. Thus, embodiments of the present inventive concept can automatically calibrate the mesh without any antennas being locked. In these embodiments, the measured distance between the antennas may be used to position each antenna in relation to the others in an arbitrary reference frame. To relate the calibrated mesh to the map image a combination of the above techniques can be used to correct for rotation in the X, Y plane; rotation out of the X, Y plane; and mirrored solutions. These embodiments can additionally have an offset in the X, Y and Z dimensions from the true locations of the antennas. To address this, a utility can be provided that allows the mesh (antenna mesh network) as a whole to be offset and positioned relative to the map image.

In some embodiments of the present inventive concept, the methods and systems discussed herein can be used to perform fine adjustments to the scale or determine if the scale was set erroneously by the user. Once two or three antennas are locked in their known positions the geometric distance between them can be calculated using the distance on the map, in pixels, and the scale, in pixels per unit distance. If that calculated value is substantially different from the measured distance between the antennas, it can be determined that a user set the scale incorrectly. If it differs only slightly, fine adjustments may be made to the scale to increase the accuracy of the calculated locations relative to the positions on the map.

As discussed briefly above, some embodiments of the present inventive concept provide methods, systems and computer program products for automatically calibrating antennas positioned in a target environment.

Figure 8:
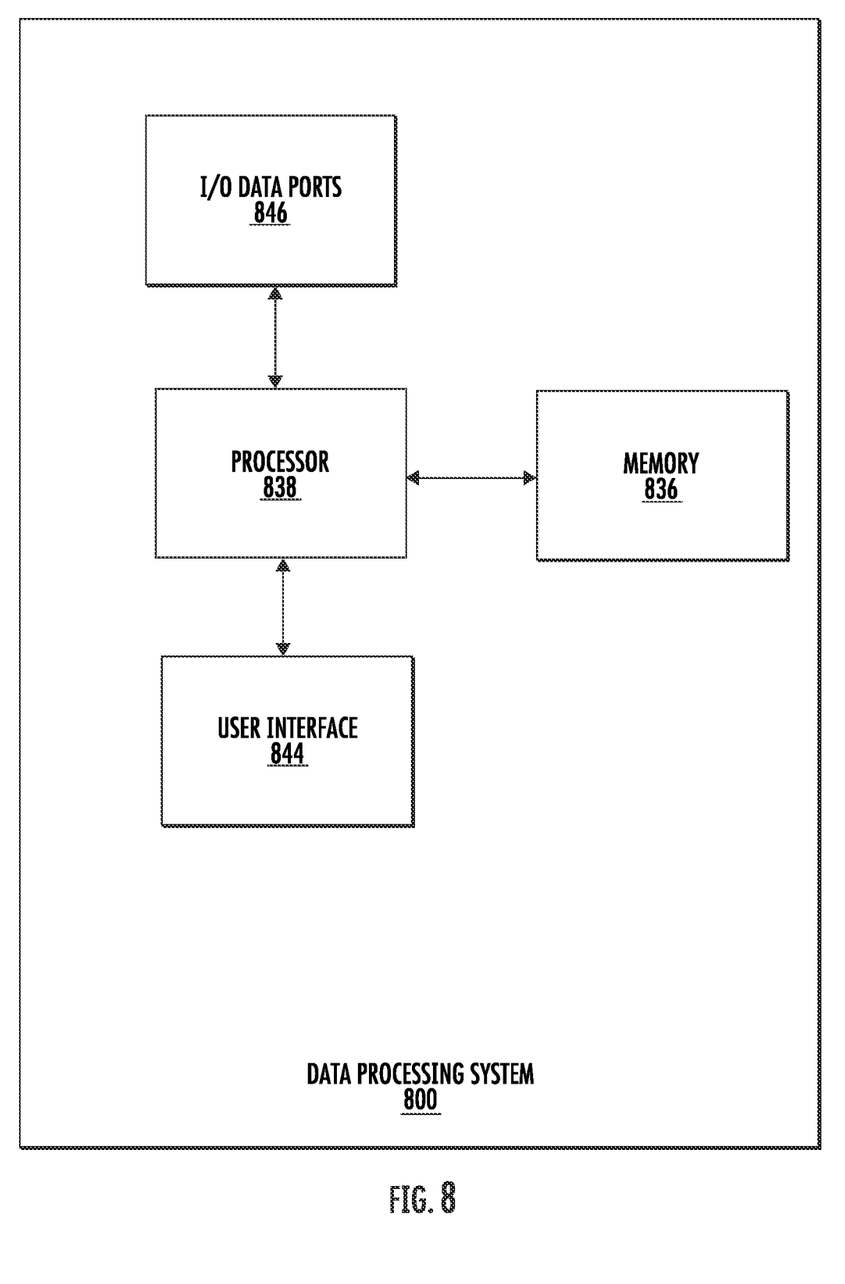
FIG. 8 is a block diagram of a data processor that may be used in conjunction with some embodiments of the present inventive concept.

Referring now to FIG. 8, an exemplary embodiment of a data processing system 800 suitable for use in accordance with some embodiments of the present inventive concept will be discussed. For example, the data processing system 800 may be provided to perform the algorithms and calculations as discussed in accordance with embodiments of the present inventive concept. As illustrated in FIG. 8, the data processing system 800 includes a user interface 844 such as a display, a keyboard, keypad, touchpad or the like, I/O data ports 846 and a memory 836 that communicates with a processor 838. The I/O data ports 846 can be used to transfer information between the data processing system 800 and another computer system or a network. These components may be conventional components, such as those used in many conventional data processing systems, which may be configured to operate as described herein. This data processing system 800 may be included any type of computing device without departing from the scope of the present inventive concept.

Figure 9:
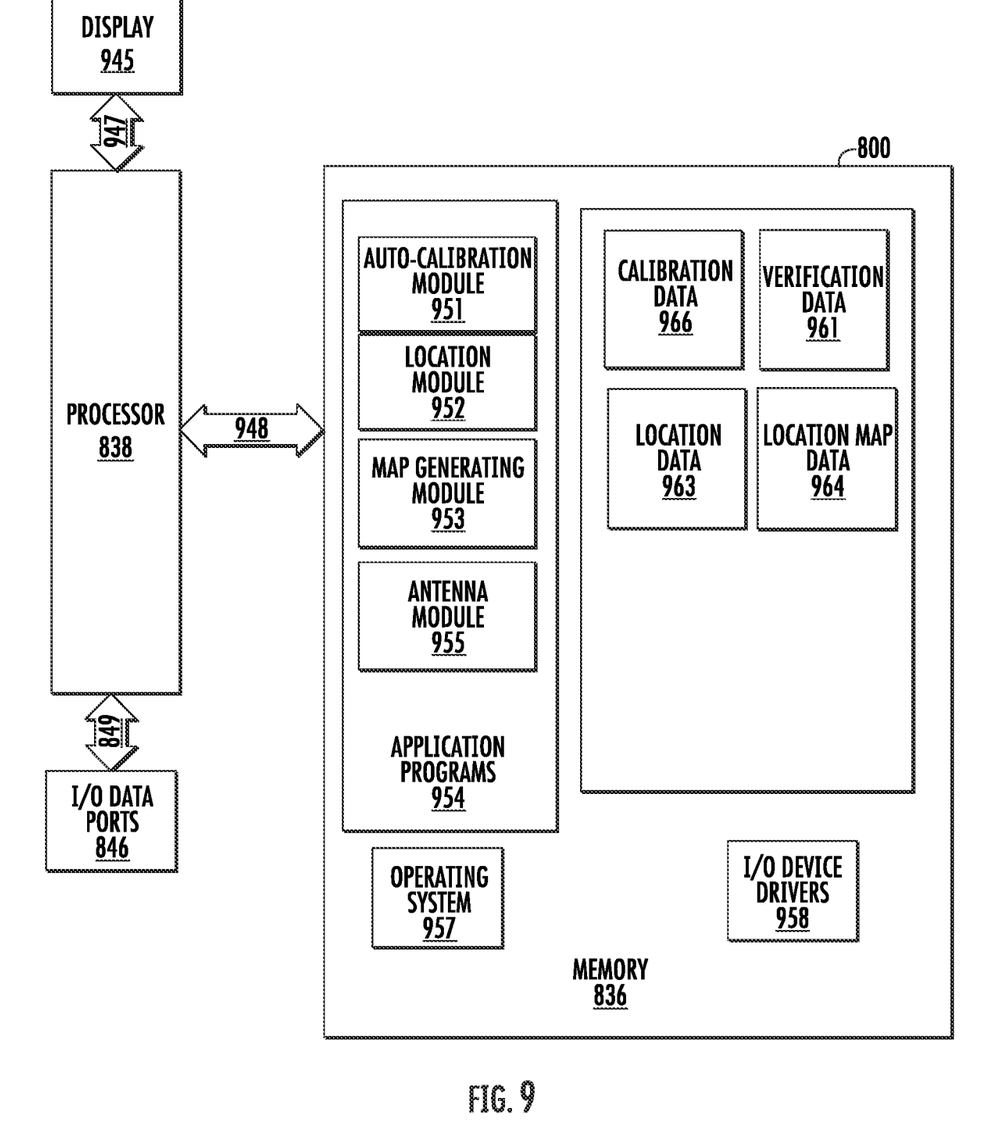
FIG. 9 is a more detailed block diagram of a data processing system that may be used in accordance with some embodiments of the present inventive concept.

Referring now to FIG. 9, a more detailed block diagram of the data processing system 800 in accordance with some embodiments of the present inventive concept will be discussed. The processor 838 communicates with a display 945 via and address/data bus 947, the memory 836 via an address/data bus 948 and the I/O data ports 846 via an address/date bus 949. The processor 838 can be any commercially available or custom microprocessor or ASICs. The memory 836 is representative of the overall hierarchy of memory devices containing the software and data used to implement the functionality of the data processing system 800. The memory 836 can include, but is not limited to, the following types of devices: cache, ROM, PROM, EPROM, EEPROM, flash memory, SRAM, and DRAM.

As shown in FIG. 9, the memory 836 may include several categories of software and data used in the data processing system 800: an operating system 957; application programs 954; input/output (I/O) device drivers 958; and data 956. As will be appreciated by those of skill in the art, the operating system 957 may be any operating system suitable for use with a data processing system, such as OS/2, AIX or zOS from International Business Machines Corporation, Armonk, NY, Windows95, Windows98, Windows2000, WindowsXP, Vista, Windows 7, Windows 8 or Windows 10 from Microsoft Corporation, Redmond, WA, Unix, Linux, LabView, or a real-time operating system such as QNX or VxWorks, or the like. The I/O device drivers 958 typically include software routines accessed through the operating system 957 by the application programs 954 to communicate with devices such as the I/O data port(s) 846 and certain memory 836 components. The application programs 954 are illustrative of the programs that implement the various features of the data processing system 800 included a system in accordance with some embodiments of the present inventive concept and preferably include at least one application that supports operations according to some embodiments of the present inventive concept. Finally, the data 956 represents the static and dynamic data used by the application programs 954, the operating system 957, the I/O device drivers 958, and other software programs that may reside in the memory 836.

As illustrated in FIG. 9, the data 956 according to some embodiments of the present inventive concept may include calibration data 966, verification data 961, location data 963 and location map data 964. Although the data 1056 illustrated in FIG. 10 includes five different files 966, 961, 963 and 964 embodiments of the present inventive concept are not limited to this configuration. Two or more files may be combined to make a single file; a single file may be split into two or more files and the like without departing from the scope of the present inventive concept.

As further illustrated in FIG. 9, the application programs 954 may include an auto-calibration module 951, a location module 952, a map generating module 953 and an antenna module 955 in accordance with some embodiments of the inventive concept. While the present inventive concept is illustrated, for example, with reference to the calibration module 951, the location module 952, the map generating module 953 and the antennas module 955 being application programs in FIG. 9, as will be appreciated by those of skill in the art, other configurations may also be utilized while still benefiting from the teachings of the present inventive concept. For example, the calibration module 951, the location module 952, the map generating module 953 and the antennas module 955 may also be incorporated into the operating system 957 or other such logical division of the data processing system 800. Thus, the present inventive concept should not be construed as limited to the configuration of FIG. 9, but is intended to encompass any configuration capable of carrying out the operations described herein.

Furthermore, while the calibration module 951, the location module 952, the map generating module 953 and the antennas module 955 are illustrated in a single data processing system, as will be appreciated by those of skill in the art, such functionality may be distributed across one or more data processing systems. Thus, the present inventive concept should not be construed as limited to the configuration illustrated in FIGS. 8 and 9, but may be provided by other arrangements and/or divisions of function between data processing systems.

Referring now to FIGS. 8 and 9, as discussed above, embodiments of the present inventive concept provide systems for auto-calibrating antennas in a target environment. The system includes a map generating module 952 that is configured to obtain a map and associated scale 964 of the target environment. The target environment can be any indoor or outdoor environment without departing from the scope of the present inventive concept. The obtained or uploaded map may be illustrated on a user display device 945. An antenna module 955 discovers a plurality of antennas present in the target environment and illustrates the discovered plurality of antennas on the map. In some embodiments, the plurality of antennas may be positioned in a real time location system (RTLS) network.

A user interface 844 may be used to reposition at least some of the plurality antennas on the map. For example, a user may use a mouse to click on an antenna on the map and drag the antenna to a desired location. The antenna module 955 may then lock selected ones of plurality of antennas into a current position to provide a plurality of locked antennas. It will be understood that in some embodiments, none of the plurality of antennas may be locked, thus, resulting in zero locked antennas. The auto-calibration module 951 auto-calibrates a remaining plurality of unlocked antennas by moving each of the remaining plurality of unlocked antennas from a first position to a second position.

A location module 952 may determine x, y and z coordinates for a current location for each of the remaining plurality of unlocked antennas. A new location for each of the remaining plurality of unlocked antennas may be determined using Eqn. 1 set out above.

The antenna module 955 may be further configured to verify locations 961 of the plurality of antennas. The verification may be done by calculating a distance between a current position of one of the plurality of antennas relative to others of the plurality of antennas; determining if the calculated distance is too large; and verifying the current position of the one of the plurality of antennas if it is determined that the calculated distance is not too large. The process may be repeated for each of the plurality of antennas.

Example embodiments are described above with reference to block diagrams and/or flowchart illustrations of methods, devices, systems and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX (Asynchronous JavaScript), C, and/or C++, for development convenience. In addition, computer program code for carrying out operations of example embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a field programmable gate array (FPGA), or a programmed digital signal processor, a programmed logic controller (PLC), or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

In the drawings and specification, there have been disclosed example embodiments of the inventive concept. Although specific terms are employed, they are used in a generic and descriptive sense only and not for purposes of limitation, the scope of the inventive concept being defined by the following claims.

What is claimed is:

1. A method of auto-calibrating antennas in a target environment, the method comprising:
   obtaining a map and associated scale of the target environment;
   displaying the map to a user on a user display device;
   discovering a plurality of antennas present in the target environment;
   illustrating the discovered plurality of antennas on the map;
   repositioning at least some of the plurality antennas on the map;
   locking selected ones of plurality of antennas into a current position to provide a plurality of locked antennas, wherein the plurality of locked antennas is equal to zero or greater, wherein locking further comprises locking the selected ones of the plurality of antennas responsive to a series of mouse clicks and/or keystrokes;
   determining x, y and z coordinates for a current location for each of a remaining plurality of unlocked antennas to provide a three-dimensional (3D) location; and
   auto-calibrating the remaining plurality of unlocked antennas, wherein auto-calibrating includes moving each of the remaining plurality of unlocked antennas from a first position to a second position using the determined x, y and z coordinates,
   wherein at least one of the obtaining, displaying, discovering, illustrating, repositioning, locking and auto-calibrating are performed by at least one processor.

2. The method of claim 1, wherein locking the selected ones of the plurality of antennas responsive to a series of mouse clicks and/or keystrokes comprises pressing 'L' or right clicking on a context menu and selecting "locked" from a workstation.

3. The method of claim 1, wherein determining the current location for each of the remaining plurality of unlocked antennas comprises simultaneously determining the current location for a plurality of antennas.

4. The method of claim 3, wherein simultaneously determining the current location for a plurality of antennas comprises simultaneously determining the current location for a plurality of antennas using multi-variable mathematics.

5. The method of claim 4, wherein simultaneously determining the current location for a plurality of antennas using multi-variable mathematics comprising linearizing multi-variable functions and determining a matrix relating distance to antennas.

6. The method of claim 1, wherein autocalibration is followed by verifying determined locations of the plurality of antennas by using surrounding antennas to determine the current location of each antenna and wherein location is represented in xyz coordinates.

7. The method of claim 6, wherein using the surrounding antennas to determine location of each antenna comprises:
   calculating a distance between a first antenna and at least one surrounding antenna; and
   providing an indication that the current location of the first antenna is not verified if the calculated difference is too large.

8. The method of claim 1, wherein two antennas are locked and positions of one or more remaining unlocked antenna were mapped in a mirrored position where a symmetry axis is a line created by the two locked antennas, the method further comprising verifying positions of the one or more remaining unlocked antennas are checked to verify the one or more remaining unlocked antennas are within map boundaries.

9. The method of claim 8, wherein the unlocked antennas are determined to be outside map boundaries, the method further comprising flipping positions of one or more remaining unlocked antennas about the symmetry axis created by the two locked antennas.

10. The method of claim 1, further comprising calculating a geometric distance between the plurality of locked antennas using a distance on the map, in pixels, and a scale, in pixels per unit distance.

11. The method of claim 10, wherein if the calculated geometric distance is substantially different from a measured distance between the plurality of locked antennas, it is concluded that a user set the scale incorrectly.

12. The method of claim 10, wherein if the calculated geometric distance only differs slightly from a measured distance between the plurality of locked antennas, the method further comprising making fine adjustments to a scale to increase accuracy of calculated locations relative to the positions on the map.

\* \* \* \* \*